United States Patent [19]

Barp et al.

[11] Patent Number: 5,264,300
[45] Date of Patent: Nov. 23, 1993

[54] CENTRALLY SYMMETRICAL FUEL CELL BATTERY

[75] Inventors: Bruno Barp, Rudolfstetten; Roland Diethelm, Bauma, both of Switzerland

[73] Assignee: Gebrueder Sulzer Aktiengesellschaft, Winterthur, Switzerland

[21] Appl. No.: 968,556

[22] Filed: Oct. 29, 1992

[30] Foreign Application Priority Data

Jan. 9, 1992 [CH] Switzerland ............... 00042/92

[51] Int. Cl.$^5$ ............................................. H01M 8/04
[52] U.S. Cl. ..................................... 429/30; 429/34; 429/39
[58] Field of Search ............ 429/34, 38, 39, 30, 429/13

[56] References Cited

U.S. PATENT DOCUMENTS

| | | | |
|---|---|---|---|
| 5,116,696 | 5/1992 | Barp | 429/34 X |
| 5,175,063 | 12/1992 | Ishihara et al. | 429/32 |
| 5,178,970 | 1/1993 | Jansing et al. | 429/38 |

FOREIGN PATENT DOCUMENTS

0437175A1  7/1991  European Pat. Off. .
2025118A   1/1980  United Kingdom .

OTHER PUBLICATIONS

Patent Abstracts of Japan, vol. 15, No. 54; JP,A, 02284 362 (Fuji Electrical Co. Ltd); Nov. 21, 1990.
Patent Abstracts of Japan, vol. 12, No. 493; JP,A, 63 207,054 (Fujikura Ltd); Aug. 26, 1988.
Patent Abstracts of Japan, vol. 13, No. 114; JP,A, 63 285 876 (Ishikawajima Harima Heavy Ind. Co. Ltd.); Nov. 22, 1988.

*Primary Examiner*—Anthony Skapars
*Attorney, Agent, or Firm*—Townsend and Townsend Khourie and Crew

[57] ABSTRACT

A centrally symmetrical fuel cell battery is made of stacked modules each of which has an electrochemical active plate made of one oxide ion conducting solid electrolyte and two electrodes, a gas impervious wall between an air chamber and a fuel chamber, an air conduit from at least one peripheral intake location to a center of the module where the air comes in contact with the electrochemically active plates, and a central supply point for a gaseous fuel. Unlike prior art fuel cell batteries of this type which require seal rings, the fuel cell battery of this application requires no seal rings. The electrochemically active plates are continuous, and supply conduits for the fuel are provided for directing the fuel to each module from at least one intake on the periphery of the module to a central supply point of the module.

8 Claims, 2 Drawing Sheets

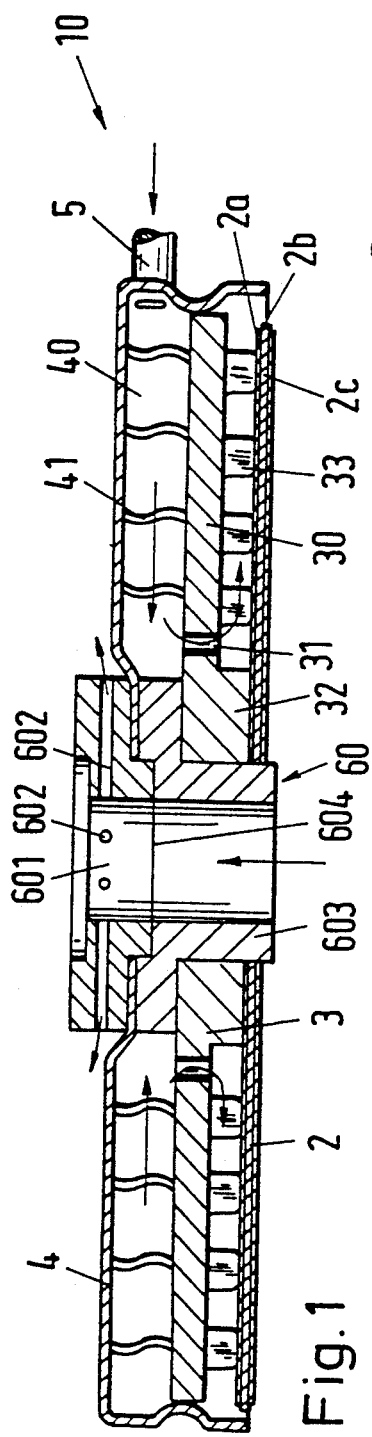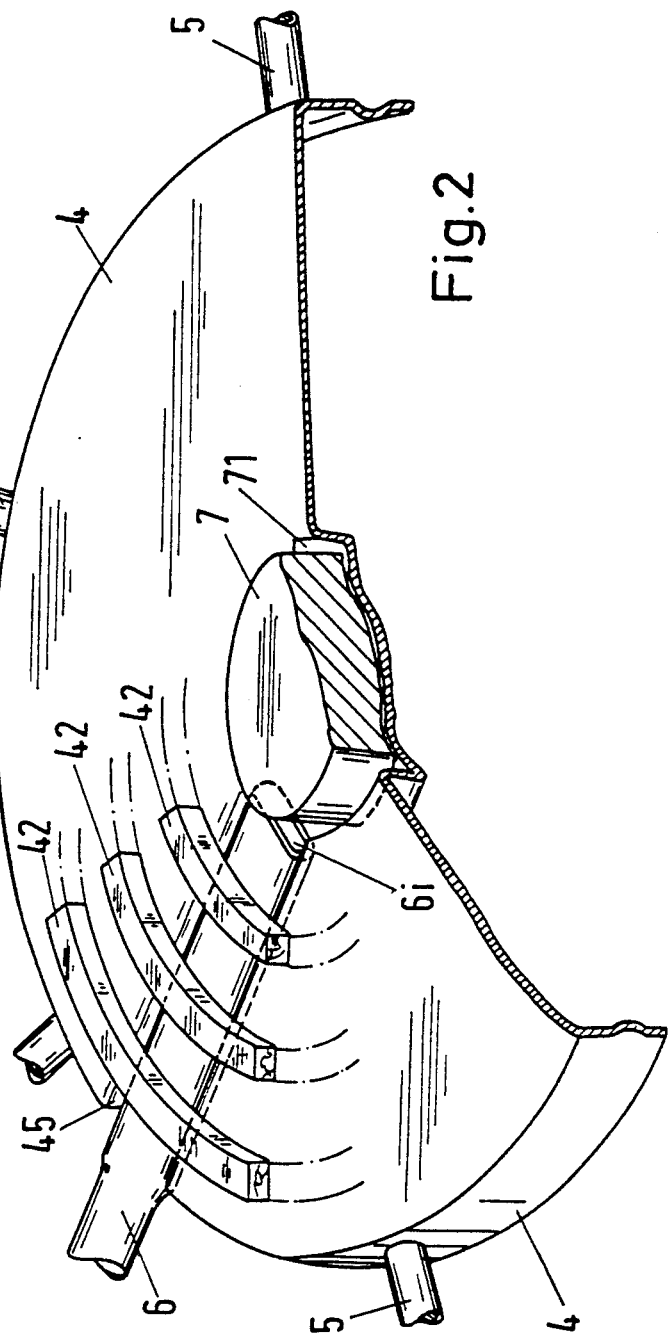
Fig.1
Fig.2

CENTRALLY SYMMETRICAL FUEL CELL BATTERY

BACKROUND OF THE INVENTION

The invention relates to a fuel cell battery with modules disposed in a stack. Each module includes a centrally symmetrical, electrochemically active plate, which consists of an oxide ion-conducting solid electrolyte and two electrodes. A gas-tight partition wall is positioned between an air space and a fuel space. The fuel cell battery also includes a means for conveying air from at least one peripheral feed point to the center of the module where the air comes into contact with the electrochemically active plates, and a central supply point for a gaseous fuel. The fuel, which is called gas for brevity in the following, is brought into contact with fuel electrodes. The fuel electrode in question belongs either to the electrochemically active plate of the same module with which the central gas supply is associated or to that of an adjacent module, according to the definition of the module boundaries. If the boundary of the module is formed by the gas-tight partition wall, this wall may consist of two parallel plates, with one of the plates forming the closure of one module and the other that of an adjacent module. The electrochemically active plate consists of three layers, i.e. a positive electrode (air side), a solid electrolyte and a negative electrode (gas side). This structure has been given the name "PEN", a term which will also be used in the following for the electrochemically active plate.

The CH-PS 678775 (or EP-A-0437175) discloses a fuel cell battery whose series-connected cells or modules form a centrally symmetrical stack. Gas is supplied via an axial duct, from which distributor lines lead into the individual modules. Sealing rings are provided between adjacent modules at the central gas duct to separate the air and gas spaces. The air, which is supplied to the fuel cell battery after being preheated, is additionally heated in heat exchangers, which are incorporated into the modules. These internal heat exchangers at the same time form the means for conveying the air from peripheral feed points to the center of the module. The air and the gas are conveyed in parallel flow on either side of the PEN. The internal air heat exchanger of the described fuel cell is essentially formed by the gas-tight partition wall and an air guide plate which is parallel to this wall or to the PEN. The air which is fed in flows in the space between the partition wall and the air guide plate towards the center of the module, where openings to the PEN are disposed. The air then flows back from these openings along the surface of the PEN to the periphery. The air may also be conveyed to the center of the module by means of pipes, for example, which also operate as heat exchangers, instead of by means of air guide plates.

The air, the oxygen of which is only partly consumed, mixes with the gas, which has also not reacted completely in the electrochemical process, at the periphery of the modules. This mixture may be combusted in order to produce heat which can be used to preheat the air. The combustion may take place directly at the periphery of the modules or in a separate afterburner.

An advantage of the centrally symmetrical fuel cell battery is that just one seal is required for each module. However even this seal represents a serious problem for which a satisfactory solution has not yet been found. The object of the present invention is to provide a centrally symmetrical fuel cell battery in which the gas and air spaces are reliably separated from one another at the center. This object is solved by the characterising features of claim 1.

SUMMARY OF THE INVENTION

The electrochemically active plates of the present invention do not include any openings. The supply members are provided for the fuel through which members the fuel can be conveyed from at least one point at the periphery of the module to the central supply point for each module.

Gas duct seals are no longer required as a result of this solution.

This solution also eliminates another difficulty connected with the manufacture of the PENs. It has been found that slight cracks occur at their inner edges when the PENs are formed as annular discs. Cracks do not form in PENs without openings.

There are various possible ways of forming the gas supply lines according to the teaching of the invention. For example, the supply member for the fuel pipe can be radially inserted in the module, or the gas-tight partition wall can include a radial recess for the fuel pipe on the gas space side. Alternatively, the supply member can be rigidly incorporated into the module and include at the periphery of the latter a coupling point for a gas distributor, or the supply member for the fuel can be disposed in the air space. It is, moreover, possible to combine these gas supply lines with a catalyst for the purpose of "reforming" (claims 6 and 7). During "reforming" a mixture of methane and water in the vaporous state or a mixture of methane, water and carbon dioxide is catalytically converted into hydrogen and carbon monoxide in an endothermic process. Methane may be replaced by natural gas, which consists chiefly of methane.

BRIEF DESCRIPTION OF DRAWINGS

FIG. 1 shows a module of a known fuel cell battery,

FIG. 2 shows the gas-tight partition wall of a module according to the invention for a first embodiment.

DESCRIPTION OF THE PREFERRED EMBODIMENTS

Figure 3:
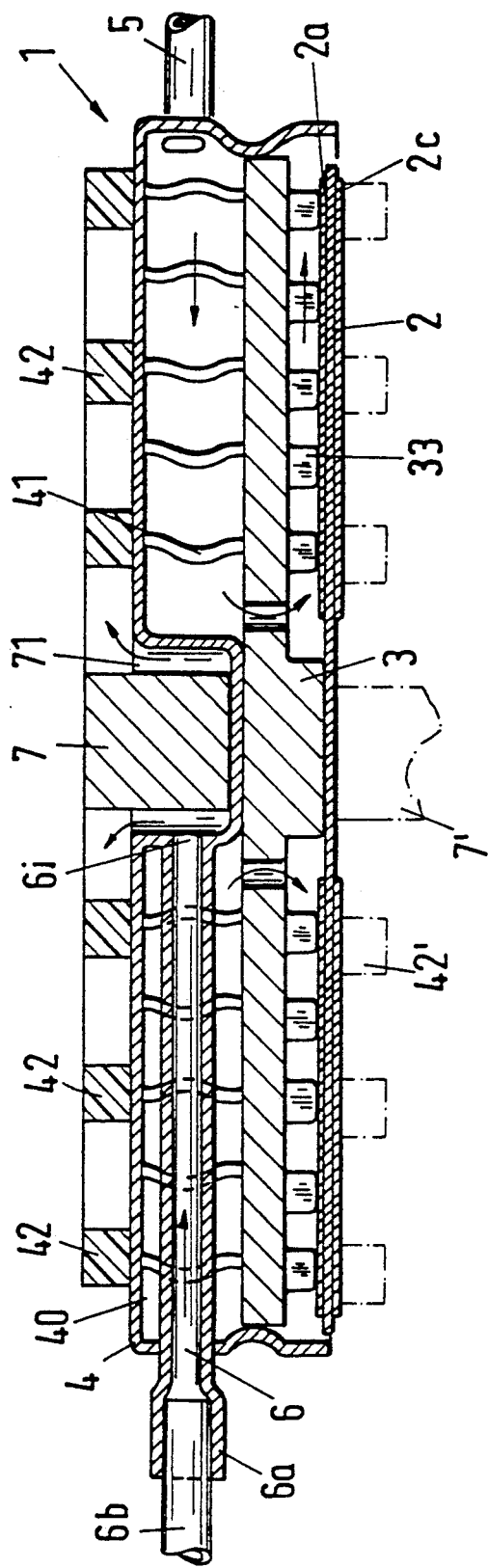
FIG. 3 is a cross section through a module for a second embodiment of the invention.

The known module 10 of FIG. 1 comprises the following components: the PEN 2, the "interconnector" 3, the gas-tight partition wall 4, a peripheral air feed point 5 and the central gas duct 60. The gas duct is composed of members 601 and 603, which fit tightly on top of one another at the joint 604. The member 601 with the distributor lines 602 forms the central supply point for the fuel. The PEN with the air electrode 2a, the electrolyte 2b and the gas electrode 2c is sintered together with the interconnector 3, which is made of a ceramic, electrically conductive material. The structure of the interconnector 3 consists of a continuous layer 30 with openings 31 in the central area, with a central ring 32 as the inner closure and with knob-like connecting members 33 between the layer 30 and the PEN 2. The layer 30 has the function of the air guide plate of the fuel cell known from the CH-PS 678775. The air space 40 between the interconnector 3 and the partition wall 4 is bridged by electrical conductors 41. Electrical conductors are also provided between the partition wall 4 and the PEN of the adjacent module, which is not shown. These conductors are not shown either.

The air which is fed in at the point 5 flows in the space 40 to the center of the module, while absorbing heat, and then passes via the openings 31 to the PEN, where it supplies the oxygen for the chemical reaction upon flowing back to the periphery. The gas flows parallel to the air on the other side of the PEN, while being partly converted into the waste gas components water and carbon dioxide, and finally mixes at the periphery with the air, the oxygen of which has also only been partly consumed.

It is indicated in FIG. 2, which relates to a fuel cell according to the invention, how the electrical conductors 42 may be formed between the partition wall 4 and the adjacent module: these are closed rings which are made of a gas-permeable, metallic felt.

In the first embodiment of the invention (FIG. 2) the gas is conveyed from the periphery of the module via a radial line 6 to the outlet hole 6i at the center of the module. Spacers 7, which are made, for example, of a ceramic material, are disposed at the center instead of the axial gas duct. In order that the spacing between the partition wall 4 and the PEN of the adjacent module can be kept to a minimum, a groove-like recess 45 for the fuel pipe 6 is provided in the partition wall. This supply member 6 for the fuel can be radially inserted in the module. The gas flowing into the module through the supply member 6 is dispersed into the gas space via the central annular duct 71. On account of their flow-throttling effect, the felt rings 42 ensure that the gas is uniformly distributed.

FIG. 3 with the second embodiment according to the invention shows the following components of the module 1: the PEN 2 with the two electrodes 2a and 2c, the interconnector 3 with the current-conducting members 33, the gas-tight partition wall 4 with wire-like and felt-like current conductors 41 and 42, respectively, an air feed point 5, the gas supply member 6 and the central spacer 7 which, together with a pot-shaped recess in the partition wall 4, forms an annular duct 71. The felt-like current conductors 42' and the spacer 7, are indicated by dot-dash lines for an adjacent module. In this second embodiment the supply member 6 for the fuel is rigidly incorporated into the module and comprises at the periphery of the latter a coupling point 6a for a connecting pipe 6b to a gas distributor, which is not shown. The supply member 6 is disposed in the air space 40, its central orifice 6i at the annular duct 71 is fitted tightly in the partition wall 4.

As already mentioned, the boundary of the module can be varied. For example, one set of current conductors 42' on the gas side may be rigidly connected to the PEN, while the other set of current conductors 42 on the gas side belong to the adjacent module and are only brought into electrical contact with the gas-tight wall 4 by being pressed against it.

Figure 4:
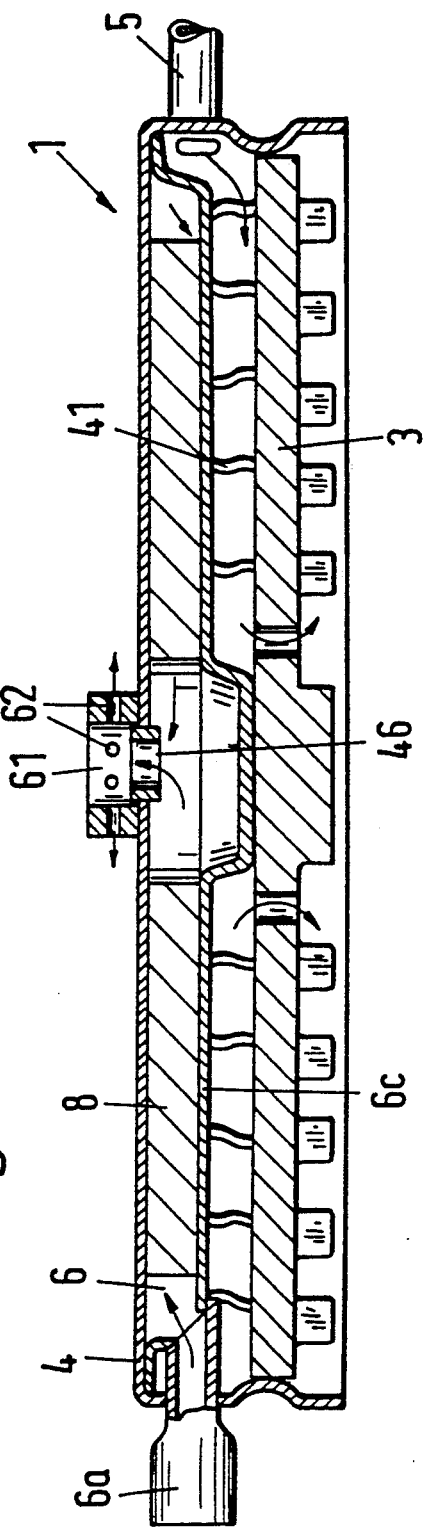
FIG. 4 is a cross section through a module in which the gas supply line according to the invention is combined with a catalyst.

The fuel supply member 6 of the fuel cell in FIG. 4 is formed as a container in which a material having a catalytic action, for example nickel, is disposed on a porous body 8 for the above-mentioned reforming. The wall of the container is formed by the partition wall 4 and a second wall 6c. As in the case of the second embodiment, a coupling point 6a for a gas distributor is also provided here. The fuel passes via a central hole 46 into the distributor 61 with the ducts 62 after the reforming process. This distributor 61 also performs the function of the spacer 7. The interconnector 3 is shown without the PEN and without the current conductors 42 in FIG. 4. In this case the current conductors 41 connect the interconnector 3 to the second wall 6c of the catalyst container.

As the reforming takes place inside the fuel cell, the energy required in this process can be supplied by thermal conduction directly from the PEN, where, in addition to the electrical energy, thermal energy which is of high value thermodynamically is also released during the electrochemical process.

The central supply points for the gas are in each case represented in combination with spacers of the modules in the embodiments described above. These spacers may, for example, also be formed by members at the periphery. In this case the central supply point may, for example, just consist of the outlet hole 6i of the supply member 6 (FIG. 2, FIG. 3) and the pot-like recess without the spacer 7. It is also possible, for example, to provide the supply member 6 with a curved end, so that the outlet hole 6i is directed parallel to the PEN; the pot-like recess in the center of the module then becomes unnecessary. In these cases without central spacers the central supply point basically consists just of the outlet hole 6i of the supply member 6.

We claim:

1. Fuel cell battery with modules disposed in the manner of a stack, each module comprising a centrally symmetrical, electrochemically active plate, which comprises an oxide ion-conducting solid electrolyte and first and second electrodes, a gas-tight partition wall between an air space and a fuel space, means for conveying air from at least one peripheral feed point to a center of the module, where the air comes into contact with the electrochemically active plates, and a central supply point for a gaseous fuel, wherein the electrochemically active plates are free of any openings, and supply members are provided for the fuel and through which the fuel can be conveyed from at least one feed point at the periphery of the module to the central supply point for each module.

2. Fuel cell battery according to claim 1, wherein the supply member for the fuel is a pipe which can e radially inserted in the module.

3. Fuel cell battery according to claim 2, wherein the gas-tight partition wall comprises a radial, groove-like recess for the fuel pipe on the gas space side.

4. Fuel cell battery according to claim 1, wherein the supply member for the fuel is rigidly incorporated into the module and comprises at the periphery of the latter a coupling point for a gas distributor.

5. Fuel cell battery according to claim 4, wherein the supply member for the fuel is disposed in the air space.

6. Fuel cell battery according to claim 1, wherein the central supply point comprises the outlet hole of the supply member.

7. Fuel cell battery according to claim 1, wherein the fuel supply member is formed as a container with a catalyst, by means of which a mixture of methane and water vapor or a mixture of methane, water vapor and carbon dioxide can be converted into hydrogen and carbon monoxide.

8. Fuel cell battery according to claim 7, wherein the wall of the container with the catalyst comprises the gas-tight partition wall and a second wall.

* * * * *